United States Patent [19]

Ganguly et al.

[11] 4,376,917

[45] Mar. 15, 1983

[54] SOLID-STATE CYCLOTRON MASER

[75] Inventors: Achintya K. Ganguly; Kenneth L. Davis, both of Alexandria; Kwo R. Chu, Annandale, all of Va.

[73] Assignee: The United States of America as represented by the Secretary of the Navy, Washington, D.C.

[21] Appl. No.: 163,003

[22] Filed: Jun. 25, 1980

[51] Int. Cl.³ ............................................. H01S 1/02
[52] U.S. Cl. .............................. 331/94.1; 331/107 R
[58] Field of Search ........ 331/94, 96, 107 R, 107 DP, 331/86, 94.5 H; 330/4

[56] References Cited

U.S. PATENT DOCUMENTS 3,533,011 10/1970 Feinstein et al. ...................... 331/94
3,617,911 11/1971 Copeland ........................... 331/94 X

OTHER PUBLICATIONS

Ganguly et al., "Theory of a Solid-State Cyclotron Maser", Physical Review B, vol. 18, No. 12, Dec. 15, 1978, pp. 6880-6889.
Kataoka et al., "Angular Dependence of Microwave Emission from InSb on the Magnetic Field", Proceedings of IEEE, Jun. 1967, pp. 1080-1081.
Tacano et al., "Continuous Coherent Microwave Oscillation from n InSb", Journal of Applied Physics, vol. 42, Sep. 1971, pp. 4006-4014.
Van Nieuwland et al., "Cyclotron Waves in InSb", IEEE Transactions on Electron Devices, vol. Ed-14, Sep. 1967, pp. 596-599.

Primary Examiner—Siegfried H. Grimm
Attorney, Agent, or Firm—Robert F. Beers; William T. Ellis; Vincent J. Ranucci

[57] ABSTRACT

A solid-state cyclotron maser for generating low power (1 watt or less) signals in the submillimeter frequency range (300 GHz-30,000 GHz) includes an accelerating region, a drift region, and a metal grid therebetween. Both regions are formed from semiconductor material, such as indium antimonide, having non-parabolic energy bands. The drift region is a thin disc having metallized outer surfaces, but includes an annular opening in the metal on the front side and a circular opening in the metal on the back side, and is grounded. A grid of metal rings is placed on the annular opening of the drift region. The accelerating region is a hollow cylinder having a metallized front surface. It couples to the drift region for covering the annular opening and the grid. A negative bias voltage is applied to the accelerating region and a magnetic field is applied to the maser at an angle to the axis of the maser. Electrons propagate in spiral trajectories through the accelerating region, grid and drift region. Movement of electrons within the non-parabolic energy bands of the semiconductor material causes changes in the effective mass of the electrons. Phase-bunching of electrons occurs and electrons radiate coherently. Energy is removed from the drift region at the opening on its back side.

10 Claims, 4 Drawing Figures

SOLID-STATE CYCLOTRON MASER

BACKGROUND OF THE INVENTION

This invention relates generally to solid-state masers, that is, microwave amplification by stimulated emission of radiation, and more particularly to a maser for generating low-power signals in the submillimeter frequency range.

A number of devices for generating submillimeter radiation has been developed but these mechanisms are incapable of low-power operation. Devices of the electron cyclotron maser type (J. L. Hirschfeld and V. L. Granatstein, IEEE Trans. on Microwave Theo. and Tech., MTT 25, 522 (1977)) are capable of extremely high power output (as high as $10^9$ watts), but they are incapable of operating in a low-power mode because the electron beam must be accelerated to relativistic velocities.

For the optically pumped solid state maser technique (B. Lax, "Quantum Electronics", Columbia University Press (New York, 1968), p. 248), optical pumping is used to invert the population of two specific adjacent Landau energy levels in the conduction band of a semiconductor, Carrier relaxation between these levels should give submillimeter radiation. However, attempts to implement this configuration have been unsuccessful because monochromatic sources at the proper wavelength have not been available with sufficient power.

An optically pumped submillimeter laser (Sessions M-3: Proceedings of the 2nd Intl. Conf. and Winter School on submillimeter waves and their applications, Editor S. Perkowitz, Dec. 6–11, 1976, San Juan, Puerto Rico) is a submillimeter wave gas laser which is pumped by a high power $CO_2$ laser and is a commonly used source for laboratory measurements. However, it is a very bulky and inefficient source. In addition, sources are available only at certain discrete frequencies where known laser lines exist.

Klystron tubes are available at frequencies as high as 1000 GHz. Submillimeter wave signals are obtained by generating harmonics using a mixer. For example, 1000 GHz can be obtained from the 10th harmonic of a 100 GHz signal. Obviously this is a bulky and inefficient signal source in the submillimeter frequency range.

It is desirable to efficiently generate signals in the submillimeter frequency range for use, for example, as a local oscillator in radar and communications receivers, or as a source for laboratory measurements.

SUMMARY OF THE INVENTION

The general purpose and object of the present invention is to efficiently generate low-power (1 watt or less) radiation in the submillimeter frequency range (approximately 300 GHz to 30,000 GHz). This and other objects of the present invention are accomplished by a maser formed from semiconductor material, such as indium antimonide, having non-parabolic energy bands. The maser comprises a drift region, and accelerating region, and a metal grid therebetween. The drift region is disc-shaped and grounded, the outer surfaces being metallized except for an annular opening in the metal on the front side and a circular opening on the back side. The grid includes concentric rings of metal and is placed over the annular opening of the drift region. The accelerating region is a hollow cylinder, the front surface being metallized, and the back surface covering and being coupled to the grid and annular opening of the drift region. A negative bias voltage is applied to the front surface of the accelerating region. A magnetic field is applied to the maser at an angle to the axis of the maser. Electrons move in spiral trajectories about the axis of the maser and propagate from the accelerating region through the grid and through the drift region. Movement of the electrons within the non-parabolic energy bands of the semiconductor material causes changes of the mass of the electrons. Phasebunching of the electrons occurs and the electrons radiate coherently at a frequency $\omega = SqB/m$ where S is an integer, q is the charge of an electron, B is the applied magnetic field, and m is the mass of the electrons. Energy is removed at the opening on the back side of the drift region and coupled to a propagating medium.

The present invention is advantageous in that it provides a more efficient and compact low-power source of submillimeter wavelength radiation than existing structures. With the development of new materials which have a meanfree-path of 100 microns or more, the present invention may operate in the important 100–300 GHz frequency range.

DETAILED DESCRIPTION OF THE INVENTION

Figure 1:
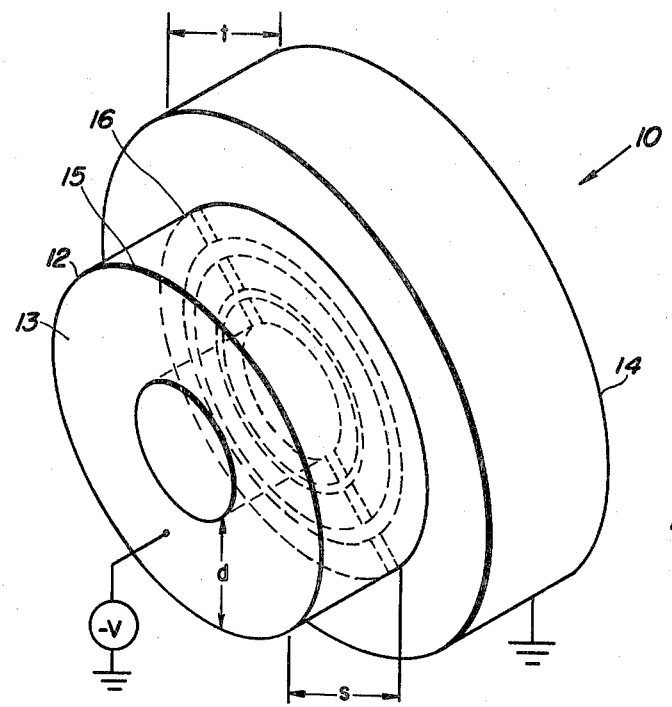
FIG. 1 is an isometric view of the present invention and shows the drift and accelerating regions, and the grid therebetween.

Referring now to the drawing, wherein like reference characters designate like or corresponding parts throughout the views, FIG. 1 shows the maser 10, formed from a semiconductor material, such as single-crystal indium antimonide (InSb), having non-parabolic energy bands. The maser 10 comprises an accelerating region 12, a drift region 14 which is free of any d.c. electric field, and a grid of fine metal rings 18 therebetween.

Figure 2:
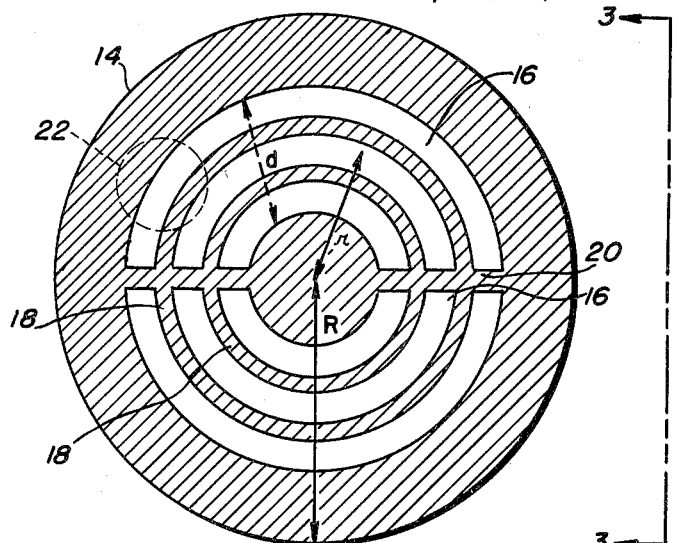
FIG. 2 is a front view of the drift region and grid.

The drift region 14 shown in FIGS. 1–4 comprises a circular, solid-dielectric cavity of lightly doped or intrinsic InSb in the shape of a disc having a thickness t and radius R. The drift region has a metallized outer surface on the front, back, and circumferential edge, and is grounded. An annular, non-metallized opening 16 in the metal is formed on the front side of the drift region. The opening 16 has a radial width d. The center of the opening 16 is a distance r from the center of the front side of the drift region. A number (two as shown in FIG. 2 for illustrative purposes) of very thin concentric refractory metal rings 18 are placed on the opening 16 for forming a grid. The grid provides an ohmic contact and prevents a Schottky barrier from being formed between the accelerating region 12 and drift region 14. A typical metal for forming the grid is gold. The opening 16 is broken by at least one metal bridge 20 so that all the metal on the drift region is at ground potential. Typically, each metal ring 18 and each non-metallized spacing of the opening 16 between the rings has a width of approximately 1000 A–2000 A (along the d dimension).

Figure 4:
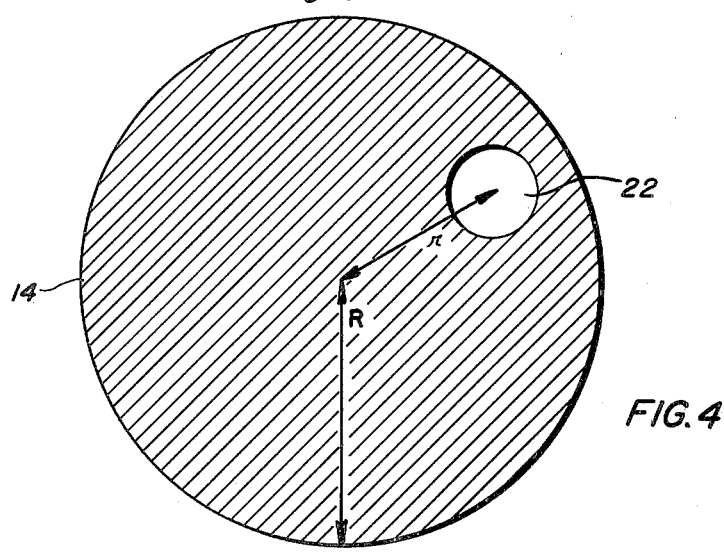
FIG. 4 is a back view of the drift region.

There is a small circular opening 22 in the metal on the back side of the drift region, as shown in FIG. 4, for coupling the signal energy out of the cavity and into a propagating medium (not shown), such as a waveguide or quasi-optical guide. The center of the opening 22 is a distance r from the center of the back side of the drift region. The distance r is chosen so that the opening 22 is at a position of high cavity fields. The diameter of the opening 22 is selected to provide an optimum impedance match to the propagating medium.

Figure 3:
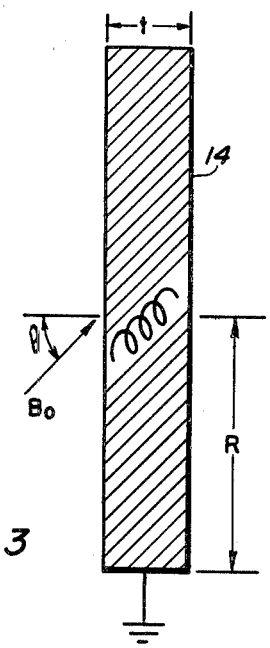
FIG. 3 is a side view of the drift region taken along line 3—3 of FIG. 2 and shows the direction of the applied magnetic field and the trajectories of electrons.

The present invention generates low-power (1 watt or less) radio-frequency (RF) signals in the submillimeter frequency range (300 GHz–30,000 Ghz). The signal mode of interest is the $TE_{011}$ mode so that the thickness t of the drift region as shown in FIGS. 1 and 3 is equal to ½ the wavelength of the RF signal generated by the present invention. Also, t must be of the order of one mean-free-path of the electrons in the semiconductor material, that is, about 10–100 microns in InSb at 77° K. The dimensions R and t of the drift region determine the distribution of RF fields in the drift region, so that $R \approx 20t$.

The size d and position r of the opening 16 are influenced by the RF fields in the drift region. Strong interaction between the electrons and the fields is necessary. The size d of the opening 16 also affects the Q (figure of merit) of the cavity since some energy will leak out the opening. Typical values for d and r are $d \approx 0.005R$ and $r \approx 0.48R$. Suggested values for the dimensions t, r, R and d are also given in "Theory of a Solid-State Cyclotron Maser", Physical Review, Volume 18, Number 12, Dec. 15, 1978, pages 6880–6889, herein incorporated by reference.

The circular cavity 14 shown in FIGS. 1–4 may be replaced by a cavity of any shape. However, the opening 16 in the metallization through which the electrons are injected must be shaped and placed so that the electrons couple most strongly with the cavity fields. For example, the circular cavity 14 may be replaced by a rectangular cavity having an opening 16 shaped as a slit rather than an annulus.

The grid may be any configuration of metal strips which form an ohmic contact between the accelerating region and drift region.

The accelerating region may be any shape but must cover the opening on the front side of the drift region.

The metal rings 18 are placed on the opening 16 and then embedded in the InSb by a method which uses a vaporphase epitaxial overgrowth, as explained by C. O. Bozler, G. D. Alley, R. A. Murphy, D. C. Flanders and W. T. Lindley, Technical Digest of Intl. Electron Devices Meeting, Washington, D.C. (1979) page 384, herein incorporated by reference.

The InSb epitaxial overgrowth is n-type and is in the shape of a hollow cylinder or annulus which forms the accelerating region 12 as shown in FIG. 1. The accelerating region 12 is coaxially aligned with the drift region 14. The annular front side 13 of the accelerating region has a thickness d, as shown in FIG. 1, for covering the non-metallized opening 16 of the drift region 14. The front side 13 of the accelerating region 12 is metallized to form an ohmic contact. A typical metal for use on the front side 13 of the accelerating region is gold. A negative bias voltage is applied at the accelerating region. The thickness s of the accelerating region, shown in FIG. 1, must be large enough to allow electrons to be accelerated to a velocity which is required to produce energy, the energy being sufficient to sustain RF oscillations, i.e., energy in the range of 20–200 meV in InSb. This thickness s should be at least about 3 microns. However, the thickness s may be as large as is desirable under the constraints that thick epitaxial films are more difficult to grow and a thick accelerating region requires a higher accelerating bias voltage.

The maser 10 is cooled to 77° K. for InSb. Electrons are accelerated in the accelerating region by applying the negative bias voltage. The electrons pass through the grid of metal rings and into the drift region. A magnetic field $B_o$ is applied to the maser at an angle $\theta$ to the axis of the drift region, as shown in FIG. 3, so as to give the electrons both a longitudinal and a transverse component of velocity with respect to the direction of $B_o$. These components cause the electrons to move in spiral or helical trajectories around the magnetic field lines. The magnetic field $B_o$ is related to the frequency $\Omega$ of interest by the following relationship:

$$\Omega = (qB_o)/m,$$

where
q is the charge of an electron, and
m is the effective mass of an electron.

The variation of the effective mass m of the electron with velocity v is given by $$m = m_o[1 - v^2/v_g^2]^{-\frac{1}{2}}$$

where $m_o$ is the effective mass of the electron at the bottom of the conduction band, and $v_g$ is defined by $$[E_g/2m_o]^{\frac{1}{2}}$$

where $E_g$ is the energy gap of the semiconductor material (approximately 0.24 ev for InSb). In InSb, $m_o \approx 0.014 m_e$, where $m_e$ is the free electron mass. Because of small values of $m_o$, the solid-state cyclotron maser can operate in the submillimeter frequency range with relatively weak magnetic fields of the order of several kilogauss.

As the electrons move in helical trajectories in the cavity, as previously described, initially the phases of the electrons in the cyclotron orbits are random and no radiation is emitted. However, phase-bunching of the electrons occurs due to the dependence of the cyclotron frequency ($\Omega = 0B_o/m$) on the electron energy. The electrons are coupled to the electric fields of the normal mode of the cavity which is determined by the semiconductor material. The electrons that are decelerated in the electric field rotate faster and accumulate phase lead while the electrons that are accelerated rotate slower and lag in phase. This results in the electrons bunching in phase and the electrons radiate coherently at a frequency $\omega = S\Omega$, where S is an integer.

The radiation is coupled to a propagating medium through the opening 22 on the back side of the drift region, as mentioned previously.

The circumferential edge 15 of the accelerating region is not metallized so that the electrons propagate axially through the maser. The outer surface of the drift region is metallized to prevent any radiation from leaking out of the drift region, thus forcing the radiation through the opening 22.

Obviously many more modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A solid-state cyclotron maser, receiving a negative bias voltage and being exposed to an applied magnetic field, for generating low-power signals in the submillimeter frequency range, comprising:

an accelerating region, a drift region, and a metal grid therebetween, said accelerating region and said drift region being formed from a semiconductor material having non-parabolic energy bands, said drift region having front and back sides which are separated by a thickness t, t being of the order of one mean-free path for electrons in the semiconductor material, said drift region having an outer surface which is coated with metal, said metal being at ground potential, said front side of said drift region having a first opening in said metal, said first opening being shaped and located such that electrons couple most strongly with radio frequency fields of the drift region, said back side of said drift region having a second opening in said metal, said second opening being located for coupling most strongly with the radio frequency fields of the drift region, said metal grid being coupled to the opening on the front side of said drift region, said metal grid forming an ohmic contact between said accelerating region and said drift region, said accelerating region having front and back sides which are separated by a thickness s, s being large enough to allow electrons to be accelerated to a velocity that is required for producing energy, the energy being sufficient to sustain RF oscillations, said front side being coated with a metal for forming an ohmic contact, the back side of the accelerating region covering the opening on the front side of said drift region, the negative bias voltage being applied to the front side of said accelerating region for accelerating electrons in the accelerating region, said electrons moving through said grid and drift region, said magnetic field being applied at an angle to the axis of said drift region for causing the electrons to propagate in helical trajectories around lines of the magnetic field and through said drift region, said electrons bunching in phase in said drift region and radiating coherently, said radiation being coupled out of said drift region at said second opening on the back side of said drift region.

2. A maser as recited in claim 1, wherein said drift region is a circular cavity comprising a disc, said front and back sides being circular and having a radius R, said first opening on the front side of said drift region being an annulus having a radial width d, the center of said radial width being a distance r from the center of said front side, said annulus being broken by at least one metal bridge, said second opening on the back side of said drift region being circular and the center of said second opening being a distance r from the center of said back side.

3. A maser as recited in claim 1, wherein said semiconductor material is indium antimonide (InSb).

4. A maser as recited in claim 2, wherein said dimensions t, R, d and r are related by R is approximately equal to 20t, d is approximately equal to 0.005R, r is approximately equal to 0.48R.

5. A maser as recited in claim 2, wherein said grid comprises concentric metal rings being spaced apart, said rings being interconnected and placed within said annulus.

6. A maser as recited in claim 2, wherein said accelerating region is an annulus having a radial width for covering said first opening on the front side of said drift region.

7. A maser as recited in claim 3, wherein said thickness t is about 10-100 microns in InSb at 77° K.

8. A maser as recited in claim 3, wherein said thickness s is large enough to accelerate electrons to a velocity which is required to produce energy in the range of 20-200 meV, that is, at least 3 microns.

9. A maser as recited in claim 3, wherein said energy for sustaining RF oscillations is about 20-200 meV.

10. A maser as recited in claim 5, wherein the radial width of each ring and each space between rings is approximately 1000 A-2000 A.

* * * * *